United States Patent [19]
Cetrulo

[11] 3,826,436
[45] July 30, 1974

[54] VINE REDUCING APPARATUS FOR COMBINE

[75] Inventor: Frank A. Cetrulo, Fort Thomas, Ky.

[73] Assignee: National Factors, Inc., Cincinnati, Ohio

[22] Filed: Nov. 10, 1972

[21] Appl. No.: 305,448

[52] U.S. Cl............. 241/186 R, 241/187, 241/200, 241/291
[51] Int. Cl........................................... B02c 13/02
[58] Field of Search......... 241/186 R, 185 R, 186.2, 241/187, 200, 291, 300.1, 301

[56] References Cited
UNITED STATES PATENTS
2,701,595   2/1955   Berger et al.................. 241/186 X Primary Examiner—Roy Lake
Assistant Examiner—DeWalden W. Jones
Attorney, Agent, or Firm—Leo Gregory

[57] ABSTRACT

A potato vine reducing apparatus for a potato combine consisting of a housing supported on said combine and including a plurality of swinging flails carried by a rotating member, said flails receiving said vines from a conveyor of said combine, a plurality of stationary knives in said housing operatively associated with said flails and means carried by said rotating member to eliminate variations in the speed of rotation of said member which would otherwise result from unusually heavy loads of vines received thereby.

3 Claims, 3 Drawing Figures

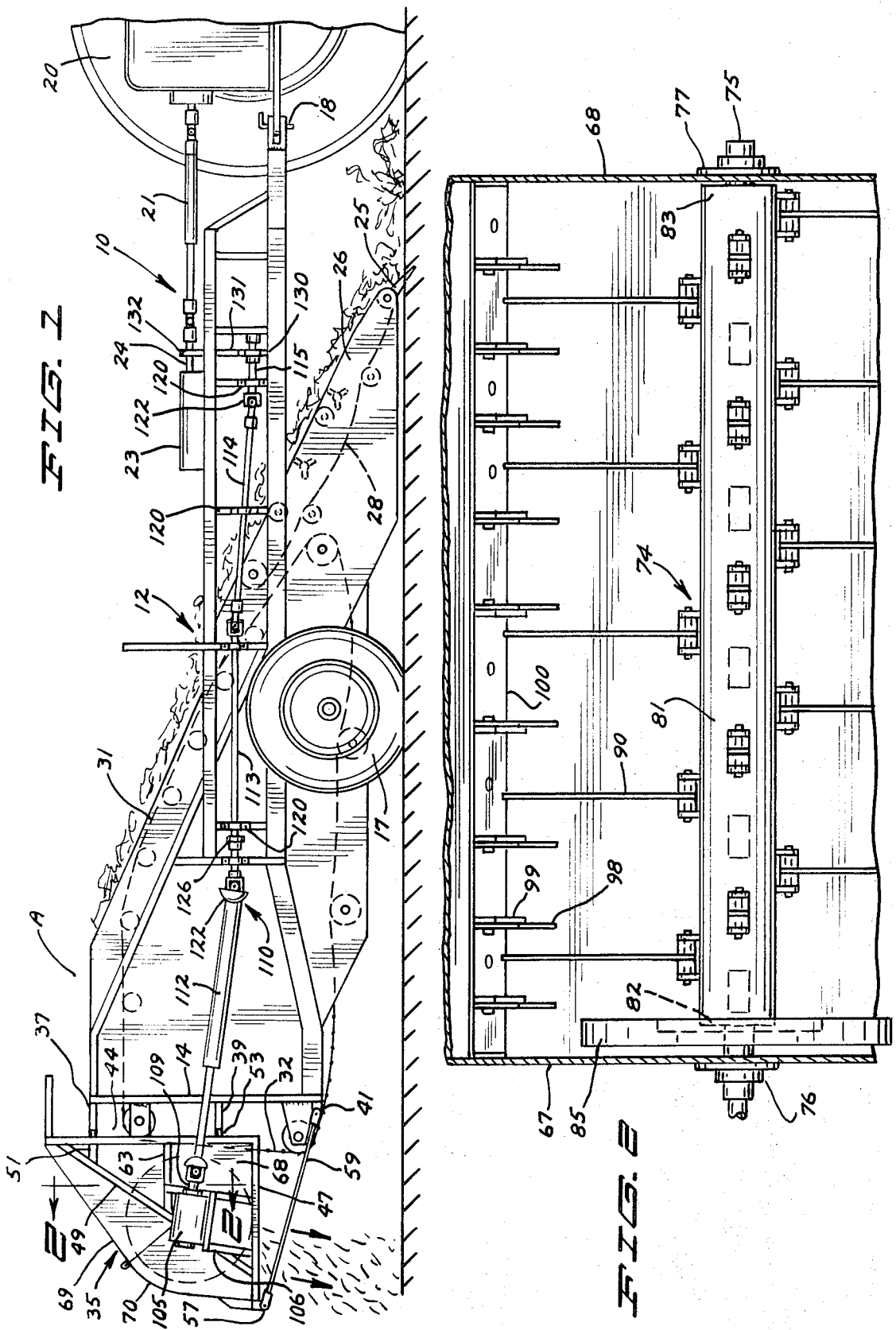

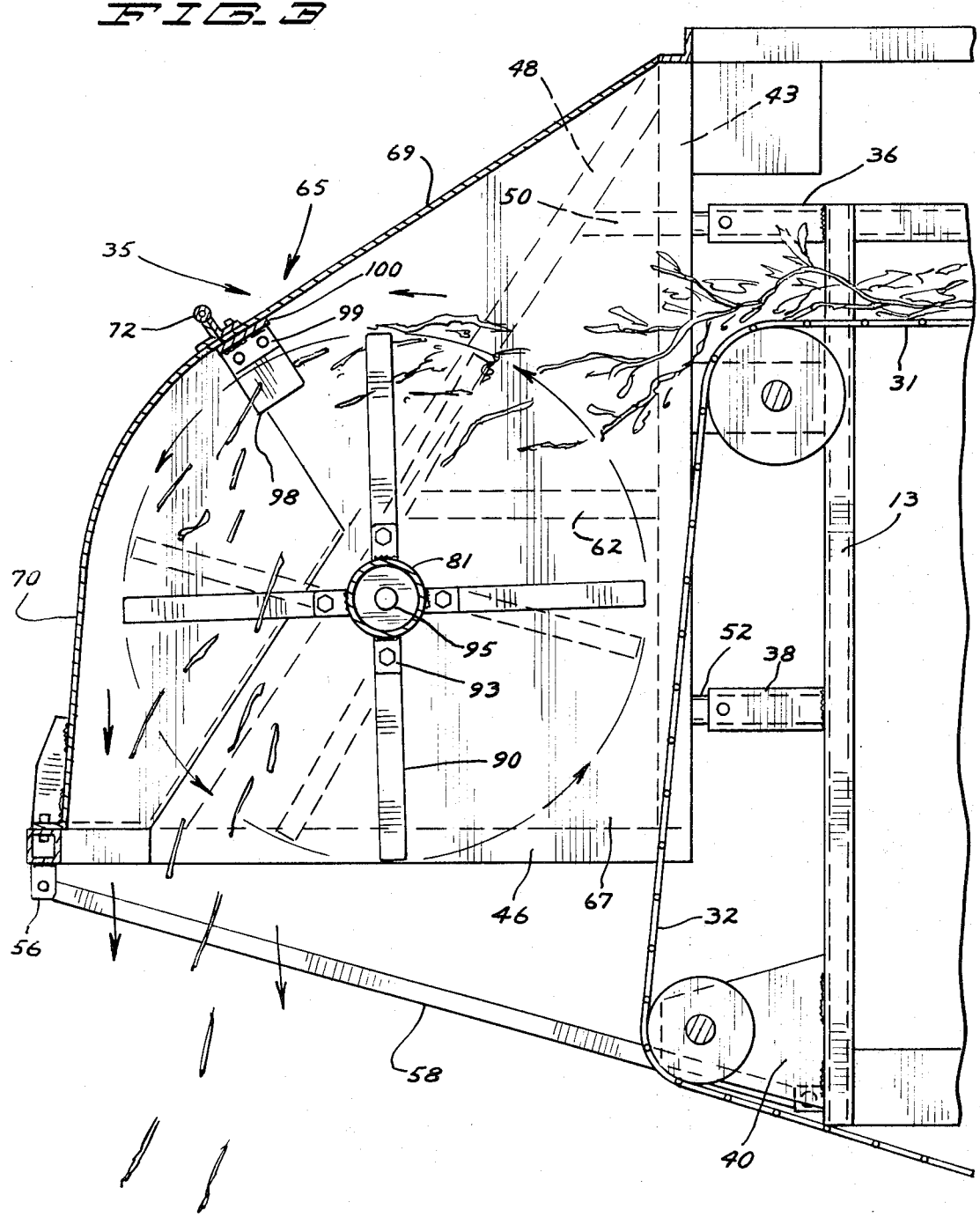

3,826,436

VINE REDUCING APPARATUS FOR COMBINE

SUMMARY AND BACKGROUND OF THE INVENTION

In combining a potato crop, the handling and disposal of the potato vines represent a problem. It is a common practice to pass the vines onto an elevating conveyor in connection with the digging of the potatoes and with the potatoes dropping through said conveyor to a transfer conveyor, the vines are moved upwardly of the combine and are discharged at the rear thereof onto the ground. Subsequently, the vines have to be removed from the field, burned or be reduced to be used as mulch. It is preferred that the vines be reduced to a form usable as mulch during the process of combining.

It is an object of this invention therefore to provide an apparatus in connection with a potato combine particularly arranged and constructed to reduce potato vines to a form usable as mulch in connection with harvesting potatoes.

It is another object of this invention in connection with the apparatus set forth in the object above to provide means for the uniform operation of said apparatus under varying and burdensome operating conditions.

More generally stated, it is an object of this invention to provide a potato combine having in connection therewith a housing, rotating means in said housing having a plurality of flails swingingly mounted thereon in operative relationship to a conveyor of said combine carrying vines, a plurality of knives spaced across said housing in operative relation to said flails and means in connection with said rotating means to make uniform the speed of said rotating means under varying loads of vines engaged by said flails.

These and other objects and advantages of the invention will be set forth in the following description made in connection with the accompanying drawings in which like reference characters refer to similar parts throughout the several views and in which:

FIG. 1 is a broken view in side elevation of a potato combine showing some portions thereof in dotted line;

FIG. 2 is a broken view in vertical section on an enlarged scale taken on line 2—2 of FIG. 1 as indicated; and FIG. 3 is a broken view in vertical longitudinal section on an enlarged scale showing the structure comprising the invention herein with portions thereof being shown in dotted line.

DESCRIPTION OF A PREFERRED EMBODIMENT

Referring to the drawings, a potato combine 10 of a conventional design is indicated in FIG. 1 with only sufficient structure thereof being shown to support an adequate disclosure of the structure comprising the invention herein.

Included in the illustration of said combine is a basic frame 12 supported by wheels 17, and supporting the front end of said combine by a hitch 18 is a tractor 20 having a power take-off 21 running therefrom to a gear box 23 carried by said combine.

A potato digging member 25 is carried by a conveyor frame 26 over which passes a digger conveyor or conveyor chain 28 which will be supported and driven in a conventional manner.

A main elevating conveyor 31 supported and driven in a known manner extends upwardly from said digger conveyor and has its end run 32 pass over the rearward portion of the combine as indicated in FIGS. 1 and 3. Potatoes and vines transfer from the digger conveyor 28 to a conveyor system not here shown for the discharge of potatoes to an appropriate vehicle. The vines A which would otherwise be discharged by said conveyor 31 rearwardly of the combine onto the ground are herein treated as will be indicated.

The structure comprising the essential novelty of the invention herein will now be described.

With particular reference to FIG. 1 and FIG. 3, a housing member 35 is mounted onto the rear transversely spaced vertical frame members 13 and 14 of said combine frame 12 and more particularly onto the corresponding pairs of mounting brackets 36–37, 38–39 and 40–41 which extend outwardly of said frame members as shown on an enlarged scale with respect to frame member 13 in FIG. 3 and as shown with the corresponding member 14 in FIG. 1.

Said housing 35 comprises a pair of transversely spaced parallel vertical frame members 43 and 44 respectively having right angled rearwardly extending bottom frame members 46 and 47. Extending between the remote end portions of said frame members 43–46 and 44–47 are angled brace members 48 and 49. A pair of mounting brackets 50 and 51 extend from the brace members 48 and 49 to said mounting brackets 36 and 37. A pair of mounting brackets 52 and 53 extend from the frame members 43 and 44 to the mounting brackets 38 and 39. Said members 46 and 47 have depending lugs 56 and 57 at their extended rearward ends from which angled brace members 58 and 59 respectively extend to the mounting brackets 40 and 41.

Thus the frame work of said housing 35 is attached to the rearward portion of said combine by being bolted thereto or it may be permanently secured thereto as by welding. A pair of cross brace members 62 and 63 extend from intermediate points of said members 48 and 49 to said members 43 and 44. A hood 65 is carried by the frame work of the housing 35 above described having side walls 67 and 68 and a top wall having an inclined upper portion 69 and a downwardly curved lower portion 70 forming a lid which is secured at its upper end portion to a hinge 72 which extends transversely of said housing whereby said lid may be raised for inspection within said housing. Said side walls 67 and 68 are at the inner sides of the side frame members described supporting and forming said housing. Said lid will have side wall portions as indicated fitting into the side walls 67 and 68. This is merely a matter of design. Said hinge member 72 will be secured transversely of said hood member 65 as indicated such as by being bolted thereto. Said hood may be secured to said frame work as by being welded thereto. Said housing 35 has an open bottom.

Carried within said housing 35 is the apparatus for reducing potato vines to a form usable as mulch including rotating means 74 including a shaft 75 which extends transversely of said housing being journaled in the side walls thereof by bearing structures 76 and 77. Carried about said shaft within said housing and secured thereon by end plates 82 and 83 is a cylindrical drum 81.

Carried at one end of said shaft within said housing is a flywheel 85 which will be designed to be adequate for purposes herein.

Disposed about said drum are a plurality of cutting means or members formed as flails 90 disposed in rows spaced at 90° intervals about said drum and in staggered relation with respect to one another thereacross. Said flails are each swingably mounted onto said drum by a U-mounting 93 having a pin 96 disposed transversely through the ears thereof and through the end portion of the flail therein. Said flails are of a length to effectively reach the end run of said conveyor to engage and receive potato vines discharged therefrom.

In operative relationship with said flails are a plurality of stationary cutting means formed herein as knives 98 which removably carried by plate like brackets may be secured as by being bolted thereto and are spaced across the inner upper wall of said hood 65 secured to a transverse plate mounting member 100. Said knives are spaced to have said flails pass therebetween and thus potato vines carried by said flails are severed upon engagement with said knives.

The number of flails and knives to be carried is a matter of design and the number illustrated here is for the purpose of illustration.

The shaft 75 has an outboard portion extending through the wall 67 into a gear box 105 having a suitable frame support 106 secured to the frame members 47 and 63.

Running to said gear box 105 from said power take-off 21 is a driving means 110. The specific make-up of said drive means is a matter of design. The embodiment of the drive means here illustrated comprises links 112, 113, 114 and 115 suitably supported by pillow blocks 120 and being connected by conventional torsionally rigid couplings 122. Said link 112 comprises telescopic portions for axial adjustment and the same is coupled to a stub shaft 109 extending from said gear box 105 for driving engagement therewith. Said link 113 includes portions connected by a slip clutch 126. The link 115 carries a pulley 130 having a drive belt 131 pass thereover and over a transversely aligned pulley 132 carried by shaft 24 extending from the gear box 23 and said shaft 24 has connected to it the power take-off 21 which is tractor driven.

OPERATION

In the operation of the apparatus herein potato vines are picked up as potatoes are dug and both are moved up to the conveyor 31. The movement of said conveyor causes the potatoes to drop through to an underlying conveyor system. The vines are carried to the end run 32 of said conveyor over the end of the combine and into the housing 35 at which point they are picked up by the flails 90.

The drum 81 carrying the flails 90 will be driven upon the commencement of the operation of the combine. The flails will be rotated in a direction opposite the direction of movement of the conveyor 31. Said flails are of a length to engage and pick up the vines as they are discharged or dropped from the end of said conveyor. The flails upon rotation in being spaced about and staggered axially of said drum 81 provide continuous means for engagement of said vines. The swinging action of the flails provides a chopping action upon engaging the vines. It will be appreciated that said vines are lengthy and bulky and will generally extend across several flails. Hence said flails carry said vines upwardly into engagement with said stationary knives 98 which knives serve to cut up the vines into short lengths. Hence the action of the flails in operative relationship with said knives reduces the vines to such a ground up condition that a fine mulch is formed.

The vines do not have uniform growth even in a single field. In some areas the growth is lush and very heavy and so much so that but for the inertia of the flywheel 85 in connection with the rotation of the drum 81, the vines would place such a burden upon the drum 81 in heavily loading the flails 90 that there would be a slow down of the speed of rotation of the drums to the point of overburdening the driving means 110 which is designed to operate at a uniform rate of speed to maintain pace with the potato digging operation.

The flywheel is designed to have sufficient mass and density that it will moderate and offset the effect of unequal and heavy loads of vines being handled by the flails to the extent of providing a uniform speed of rotation of said drum 81. The presence of the flywheel provides an essential element of novelty in the particular structural arrangement present here and results in a uniform and highly satisfactory operation under conditions of non-uniform and heavy vine growth.

The apparatus disclosed and claimed herein has been fully tested and has proved to be very successful in operation. Vines which would otherwise be gathered up or burned because of their bulk are ground up and pulverized so finely by the structure disclosed herein that they are merely turned under in the cultivation of the field to provide a fine mulch and nutrient for the soil.

It will of course be understood that various changes may be made in form, details, arrangement and proportions of the parts without departing from the scope of the invention herein which, generally stated, consists in an apparatus capable of carrying out the objects above set forth, in the parts and combinations of parts disclosed and defined in the appended claims.

What is claimed is:

1. A vine reducing apparatus in connection with a discharge conveyor of a potato combine, having in combination a housing attached to said combine having a conveyor of said combine discharging thereinto, a shaft journaled in said housing disposed at right angles to the direction of movement of said conveyor, a plurality of cutting members carried by said shaft, said cutting members being pivotally mounted onto said shaft in staggered relation circumferentially thereof and having free swinging movement relative to the movement of said shaft, and a plurality of stationary cutting means spaced across the inner wall of said housing in cooperating relationship with said cutting members and being spaced apart relative to said cutting members having said cutting members respectively swing between said cutting means.

2. The structure set forth in claim 1, wherein said shaft comprises a drum.

3. The structure set forth in claim 1, wherein said cutting means are spaced apart relative to said cutting members having said cutting members respectively swinging between said cutting means.

* * * * *